(No Model.)
L. BON.
MACHINE FOR CUTTING SUGAR CANE.
No. 385,234. Patented June 26, 1888.
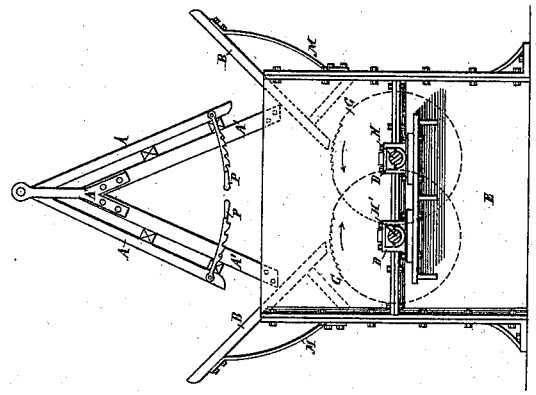
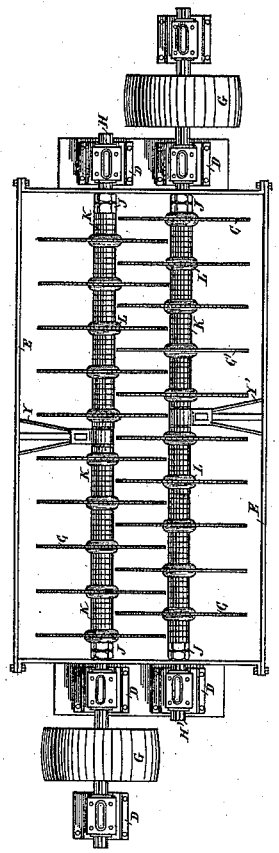

United States Patent Office.

LEOPOLD BON, OF GUANTANAMO, CUBA.

MACHINE FOR CUTTING SUGAR-CANE.

SPECIFICATION forming part of Letters Patent No. 385,234, dated June 26, 1888.

Application filed November 3, 1887. Serial No. 254,191. (No model.) Patented in Spain April 21, 1887, No. 7,027, and in England October 15, 1887, No. 14,009.

*To all whom it may concern:*

Be it known that I, LEOPOLD BON, a citizen of the Republic of France, residing at Guantanamo, in Cuba, have invented certain new and useful Improvements in Machines for Cutting Sugar-Cane, (the same having been patented in Spain April 21, 1887, No. 7,027, and in England October 15, 1887, No. 14,009,) of which the following is a specification.

This machine is intended for cutting sugar-cane into small pieces with rapidity and without waste.

In the annexed drawings, Figure 1 is a plan view of the machine, the inclined planes or "chutes" having been removed from the upper portion to afford a view of the interior. Fig. 2 represents an end view of the machine.

The machine is composed of a number of circular saws, C, fixed upon two parallel shafts, H H', which are placed horizontally and turn in opposite directions the one from the other, as indicated by arrows in Fig. 2. The saws, fixed at equal distances from one another upon each shaft, are arranged so that they overlap, or that each of them enters into the space between two of the saws of the opposite shaft. The saws, which are secured upon the shafts by the plates or collars L, can be arranged at variable distances apart from one another. This variation is obtained by means of the washers K, the number of which can be increased or diminished at will between each pair of saws in such manner as to allow for varying the length of the sticks cut according to requirement.

The shafts H and H' extend longitudinally through the rectangular frame or cistern E, and are supported midway by chairs Y Y'. The ends are supported in bearings D, and each shaft carries a pulley, G, so that the movement of rotation communicated to each of them is independent of that of the other.

The cistern E, which serves as the framework, is without bottom and may be placed above an endless apron, which will carry off the pieces of cane as fast as they are cut.

The cane arriving from the plantation is thrown or tilted from the cart upon the inclined planes or chutes A and B, which direct it uniformly between the two rows of saws. The inclined planes B are fixed to the edge of the cistern by means of supports M. The inclined planes A are hinged at their summits to the brackets A', bolted to the two ends of the cistern E. The inclined planes A can be adjusted and are maintained in the necessary position by two toothed sectors, P, which can engage with bolts fixed to the brackets A', thus forming hoppers for the cane, the feed-orifices of which are adjustable for the purpose of allowing the cane to feed more or less rapidly down the inclines to the saws, as will be readily understood.

Having now particularly described and ascertained the nature of my said invention and in what manner the same is to be performed, I declare that what I claim is—

In a machine for cutting sugar-cane, the combination, with the two oppositely-rotating shafts carrying the series of overlapping saws and the two oppositely-arranged inclined chutes for guiding the cane between said saws from opposite sides, of two inclines pivoted at their upper ends between said chutes and adjustable with relation thereto at their lower ends, whereby the cane passing down said chutes may be regulated, substantially as described.

In testimony whereof I have hereto set my hand in the presence of the two subscribing witnesses.

LEOPOLD BON.

Witnesses:
VICTOR COUSSIRAT,
ACHILLE MARILLIER.